US012664826B2

(12) United States Patent
Ritter et al.

(10) Patent No.: US 12,664,826 B2
(45) Date of Patent: Jun. 23, 2026

(54) HEALTH DIAGNOSTIC SYSTEM

(71) Applicant: Deere & Company, Moline, IL (US)

(72) Inventors: Curtis P. Ritter, Waterloo, IA (US);
Nihal Gir Goswamy, Pune (IN); **Arjun
S. Shinde**, Pune (IN)

(73) Assignee: Deere & Company, Moline, IL (US)

( * ) Notice: Subject to any disclaimer, the term of this
patent is extended or adjusted under 35
U.S.C. 154(b) by 77 days.

(21) Appl. No.: 18/763,292

(22) Filed: Jul. 3, 2024

(65) Prior Publication Data

US 2026/0011184 A1     Jan. 8, 2026

(51) Int. Cl.
G07C 5/00        (2006.01)
G06N 20/20       (2019.01)
G07C 5/08        (2006.01)
H04L 12/40       (2006.01)

(52) U.S. Cl.
CPC ............. G07C 5/006 (2013.01); G06N 20/20
(2019.01); G07C 5/008 (2013.01); **G07C
5/0808 (2013.01); H04L 12/40** (2013.01);
G07C 2205/02 (2013.01); H04L 2012/40215
(2013.01); H04L 2012/40273 (2013.01)

(58) Field of Classification Search
CPC ...... G07C 5/006; G07C 5/008; G07C 5/0808;
G07C 2205/02; G06N 20/20; H04L
12/40; H04L 2012/40215; H04L
2012/40273
USPC ....................................................... 701/31.6
See application file for complete search history.

(56) References Cited

U.S. PATENT DOCUMENTS

| | | | |
|---|---|---|---|
| 11,233,713 B2 | 1/2022 | Brinkman et al. | |
| 2014/0203952 A1* | 7/2014 | Harrison | G08B 23/00 |
| | | | 340/945 |
| 2017/0147958 A1* | 5/2017 | Hatfield | G06Q 10/063114 |
| 2018/0005132 A1* | 1/2018 | Singh | G05B 23/0283 |
| 2018/0096539 A1* | 4/2018 | Merg | G07C 5/02 |
| 2020/0312056 A1* | 10/2020 | Wang | G06N 20/10 |
| 2021/0016786 A1* | 1/2021 | Griffiths | B60W 50/14 |
| 2021/0262896 A1* | 8/2021 | Chen | G01M 15/106 |
| 2023/0038947 A1* | 2/2023 | Pinto | G07C 5/0816 |
| 2023/0231784 A1 | 7/2023 | Ritter et al. | |
| 2024/0073282 A1 | 2/2024 | Ritter et al. | |
| 2024/0086736 A1* | 3/2024 | Kwartler | G06F 11/0793 |
| 2024/0111279 A1* | 4/2024 | Yang | G05B 23/0254 |
| 2024/0371214 A1* | 11/2024 | Emerick | G06Q 10/20 |

FOREIGN PATENT DOCUMENTS

DE            10307342 B4 *   8/2005   ......... G05B 23/0251

* cited by examiner

*Primary Examiner* — Tyler D Paige
(74) *Attorney, Agent, or Firm* — Tucker Ellis LLP

(57)          ABSTRACT

A diagnostic system and technique for a machine (e.g. an
industrial machine) to detect, identify, and resolve faults and
issues with the machine, including connectivity and/or
issues with a communications system. An on-board diag-
nostic system provides monitoring of machine components
and/or the machine's communications system. The on-board
system provides faster (e.g. real-time) and more accurate
diagnostics and troubleshooting of machine issues. Captured
data is communicated to a remote system for further analysis
based on machine learning.

20 Claims, 10 Drawing Sheets

Input Data
514

Computing Device 160

Memory 508

Diagnostic
Software
510

Processor
506

Communications Interface
512

Status Data 516
Solution Data 518

700

Introduce a known fault to a first machine

702

Acquire condition data associated with the known fault

704

Train a fault simulation model based on condition data associated with the known fault

706

Generate simulated faults in a second machine and simulated condition data associated with the simulated faults

HEALTH DIAGNOSTIC SYSTEM

BACKGROUND

Modern industrial machines, which include industrial vehicles (e.g., agricultural, construction, forestry, mining vehicles, etc.) and stationary industrial equipment (e.g. generators, pumps, compressors, etc.) are complex systems having numerous electronic control modules (ECMs) and/or units (ECUs). Diagnosing failures in communication systems (i.e. Controller Area Networks (CAN), Local Interconnect Network (LIN), Ethernet, etc.) and components is becoming more difficult given the increasing complexity. Certain industrial machines are equipped with internal diagnostic systems. Internal systems, however, may be limited in scope due to size, cost, or performance considerations. Technicians and service centers are often equipped with significantly more robust and sophisticated diagnostic capabilities for other industrial machine systems. Still, connectivity and/or communication systems issues may remain elusive. For example, diagnostic trouble codes (DTCs) may or may not be present for issues that can be caused by a network component problem (wiring, termination, etc.) or by a faulty ECM.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes at least one processor coupled to a memory storing computer-executable instructions. The instructions, when executed by the at least one processor, configure the at least one processor to: acquire first fault information associated with a first set of machines; train a first model based on the first fault information associated with the first set of machines; simulate, using the first model, injection of faults for a second set of machines to generate second fault information; and train a second model based on the first fault information and the second fault information.

In another implementation, a method for a machine diagnostic system is provided. The method includes introducing a known fault to at least one of a component or a communications system of a first machine. The method also includes acquiring condition data associated with the known fault after introduction. The method also includes training a fault simulation model based at least in part on the condition data acquired. In addition, the method includes generating simulated faults in a second machine and simulated condition data with the fault simulation model. Further, the method includes training a fault identification model based at least in part on the condition data and the simulated condition data.

In yet another implementation, a system is provided. The system includes a computing device and a machine having: one or more components, a communications system communicatively coupling at least the one or more components of the machine, and a telematics device communicatively coupled to the communications system of the machine and to a remote computing device. The computing device includes at least one processor coupled to a memory storing computer-executable instructions. The instructions, when executed by the at least one processor, configure the at least one processor to: receive in-use condition data from the machine via the telematics device; identify a fault in the machine, using a fault identification model, based on the in-use condition data; determine a potential solution to the fault in the machine, using a solution recommendation model, based on at least one of the fault identified in the machine or the in-use condition data; output the potential solution to a user; receive updated condition data from the machine via the telematics device after implementation of the potential solution; and confirm the fault in the machine is resolved. The fault identification model and solution recommendation model are trained based on one or more of condition data collected based on introduction of known faults to a first set of machines, virtual condition data associated with simulated faults to a second set of machines, and solution data derived from technical resources.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
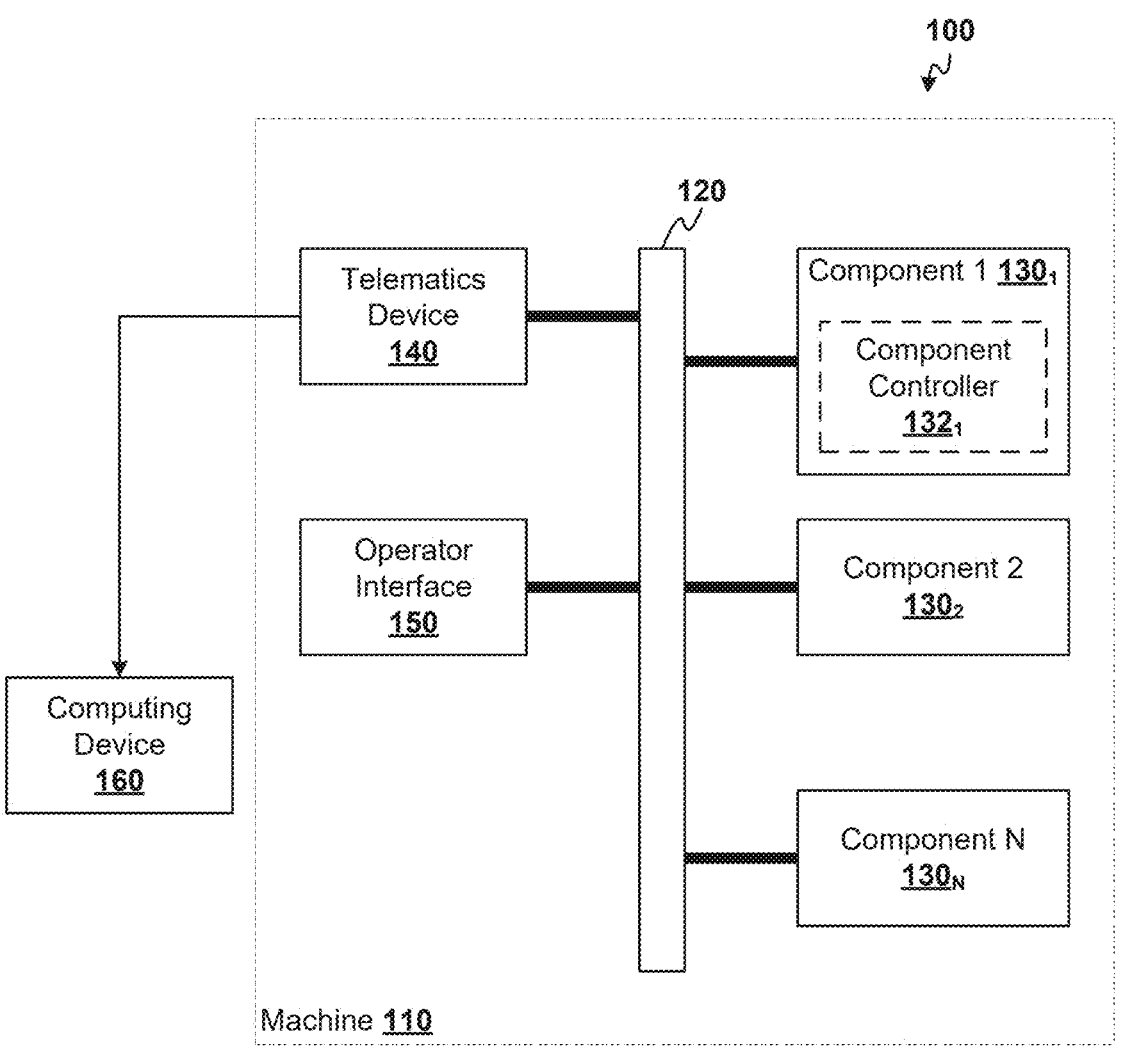
FIG. 1 illustrates an exemplary, non-limiting implementation of a system for machine diagnostics according to various aspects.

Current machine diagnostics typically involve a diagnostic tool on a technician's computing device (e.g. laptop). The technician travels on-site to the machine with the diagnostic tool and connects to the machine via an electronic data link or other connector. Such diagnostic systems are often reactive. For instance, a problem has already occurred, leading to machine down-time or other inconveniences for a customer, before a technician is dispatched to identify and/or resolve the problem. Still further, some issues can be difficult for a technician to diagnose even on-site. For example, some faults in a communications system (e.g. CAN bus or the like) such as but not limited to faulty ground connections or other intermittent electrical issues can be time consuming to track and/or locate.

Described herein is a diagnostic system and technique for a machine (e.g. an industrial machine) to detect, identify, and resolve faults and issues with the machine, including connectivity and/or issues with a communications system. An on-board diagnostic system provides monitoring of machine components and/or the machine's communications system. The on-board system provides faster (e.g. real-time) and more accurate diagnostics and troubleshooting of machine issues.

In an aspect, an on-board application is provided on a modular telematics gateway (MTG). The on-board application supports additional analysis and dealer and/or customer notifications. For example, such additional support may be provided by a system such as John Deere Expert Alerts. The on-board application generates data providing improved diagnostics-potentially with machine learning. The on-board application, being deployed on telematics device, may have direct access to a communications system (e.g. CAN bus) of the machine instead of another connection. The direct access further provides direct, real-time access to DTCs and other information relevant to machine diagnostics.

The on-board application provides new techniques for data capture. Further, the on-board application supports data analysis and troubleshooting. As the application is provisioned on a telematics device, captured data may be communicated to a remote system for further analysis and support expert alerts and machine learning. Other communications are available such as, but not limited to communication with operators and technicians through mobile applications, operator displays, and the like. The communications may provide information, diagnostics, and troubleshooting steps.

In another aspect, machine learning may be employed to automate the process of injecting faults onto a machine or communications system of the machine, analyzing data to identify and/or locate problems, and recommending solutions to identified problems. As noted above, some problems, such as problems with a communications system, can be difficult and time-consuming to resolve. Machine learning analysis improves diagnosis and resolution of such problems.

To develop solutions to problems, faults are physically created on a machine. With the techniques described herein, machine learning is employed to simulate and automate virtual fault injection. Data from the virtually injected faults can be analyzed to locate and identify the problem. Resolution information can be developed based on the analysis.

For example, the system can utilize machine learning models to analyze DTCs and CAN statistics. CAN statistics may include additional information to localize where a problem is on the CAN Bus. Such information may include errors, voltages, message count, bus load, etc. Machine learning models may also be employed to analyze solution data for CAN issues. Data sources for solution analysis may include information from an analysis and dealer and/or customer notification platform (e.g., John Deere Expert Alerts), interactive or guided solutions, technician tools (e.g. John Deere Service ADVISOR), a controller area network and connectivity health troubleshooting system (such as the system described in U.S. Pat. No. 11,233,713, incorporated herein by reference), dealer technical assistance system data, warranty claims, etc. The system can recommend a specific resolution, further diagnostic steps, or additional data capture. Still further, the system can analyze results and confirm resolution. Acquired data may also be utilized to update the machine learning models.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a system 100 for machine diagnostics is illustrated. As shown in FIG. 1, system 100 may be partially incorporated in a machine or vehicle 110. By way of example, machine 110 may be an industrial machine (e.g. a generator, a pump, a compressor, an engine, an agricultural machine, etc.) or industrial vehicle (e.g. an agricultural vehicle, a construction vehicle, a forestry vehicle, a mining vehicle, etc.). In general, system 100 described herein is applicable to substantially any machine that having various controllers communicatively coupled.

Machine 100 may include a plurality of components 130. For instance, the plurality of components 130 may include component $130_1$, component 2 $130_2$, and/or component N $130_N$, where N is any integer greater than or equal to 1. In FIG. 1, component 1 $130_1$ is shown having a component controller $132_1$. It is to be appreciated that other components of the plurality of components 130 may also have component controllers 132 even though not shown in FIG. 1. The plurality of components 130 and component controller 132 are collectively referred to herein as components 130 and component controllers 132 or individual referred to as component 130 and component controller 132 in a general manner. In one example, controller 132 may be an ECM or ECU.

The components 130 may be communicatively interconnected via a communications system 120. In one example, the communications system 120 may be a controller area network (CAN) bus. In other implementations, the communications system 120 may be a local interconnect network (LIN), an ethernet network, or other communication technologies. Further, the communications system 120 may utilize wireless communication protocols such as cellular communication technologies, WiFi, short range communications (e.g. Bluetooth, NFC, etc.), or the like.

Machine 100 includes a telematics device 140 configured for remote communications using a wired or wireless communication protocols. For example, telematics device 140 may utilize cellular communication technologies (e.g., machine-type communications, Internet of Things (IoT) protocols, etc.) or satellite communication technologies. The telematics device 140 may communicate with a computing device 160. Computing device 160 may include a remote management system (e.g., fleet management system, remote diagnostic system, or other cloud-based system), a mobile device, or other computing device (e.g. a laptop).

Machine 100 further includes an operator interface 150 (e.g., an in-cab display or other machine interface). Operator interface 150 provides another vector for various diagnostic outputs described herein.

Figure 2:
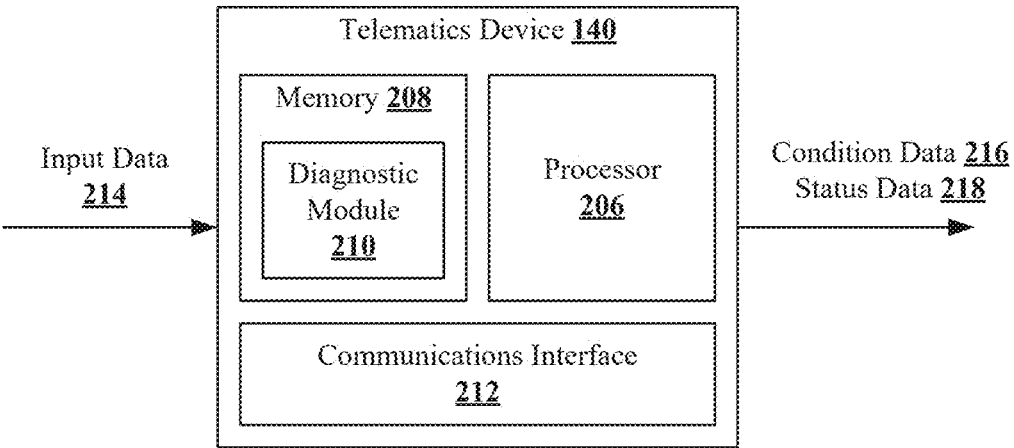
FIG. 2 illustrates a schematic diagram of an exemplary, non-limiting implementation of telematics device in accordance with various aspects.

Turning to FIG. 2, an exemplary, non-limiting implementation of a telematics device 140 is illustrated. Telematics device 140 includes a processor 206 configured to process data and instructions, and provide resulting data based on the processed data and instructions. The telematics device 140 further includes a memory 208 (e.g., computer memory, such as a device or system that is used to store information for use in a computer or related computer hardware and digital electronic devices, including short and long-term memory, temporary and permanent memory, and the like). Memory 208 stores executable instructions for diagnostic module 210. Diagnostic module 210, when executed by processor 206, acquires input data 214 and generates condition data 216 and/or status data 218. Telematics device 140 further includes a communications interface 212 configured for remote communications with a remote computing device such as computing device 160 of FIG. 1. Communications interface 212 may be a wireless communications interface. Alternatively, communications interface 212 may be a wired interface (e.g. USB, Ethernet, etc.).

Telematics device 140 may be communicatively coupled to and have direct access to communications system 120 of machine 110 (see FIG. 1). Via the direct access, telematics device 140 may monitor the communications system 120 and components 130 coupled thereto to acquire input data 214. Input data 214 may include signals, messages, DTCs, etc. present on the communications system 120 and/or originating from the components 130. Diagnostics module 210, executed by processor 206, configures the telematics device 140 to analyze the input data 214 and generate condition data 216. Condition data 216 is indicative of a condition of the communications system 120 and/or components 130. In one example, the condition data 216 may include a diagnostic trouble code, a voltage, a message count, a number of error frames, a load on the communications system, or the like.

In one example, the telematics device 140 may communicate condition data 216 to a remote computing device to identify a state of machine 110 (described in greater detail below). In another example, diagnostics module 210 may determine status data 218 indicative of a state of the communications system 120 and/or components 130 based on the condition data 216. Further, the diagnostics module 210 may analyze condition data 216 and/or status data 216 to identify a state of the machine 110. The condition data 216, status data 218, and/or the state of the machine 110 may be output to an operator via the operator interface 150 (e.g. in-cab display) or a via a mobile computing device of the operator.

Status data 218 may indicate an issue with the operation of at least one component 130 and/or the communications system 120. The status data 218 may also indicate a potential issue, a need for maintenance, or an estimated time until maintenance.

The telematics device 140 may monitor the communications system 120 and/or the components 130 in real-time. With real-time input directly acquired from the communications system 120 and/or components 130, the diagnostics module 210 can generate condition data 216 in real-time. The real-time data is analyzed to identify trending conditions. The trending conditions can be communicated to a remote computing device for further diagnostics.

In another example, telematics device 140 may passively monitor components 130 and/or communications system 120. The telematics device 140 may receive, from a remote computing device via the communications interface 212, a request for a diagnostic scan. In response to the request, the telematics device 140 may perform a diagnostic scan of the communications system 120 and/or the components 130. For instance, the telematics device 140 may probe the communications system 120 and/or the components 130 to generate data that facilities identifying and locating issues.

Figure 3:
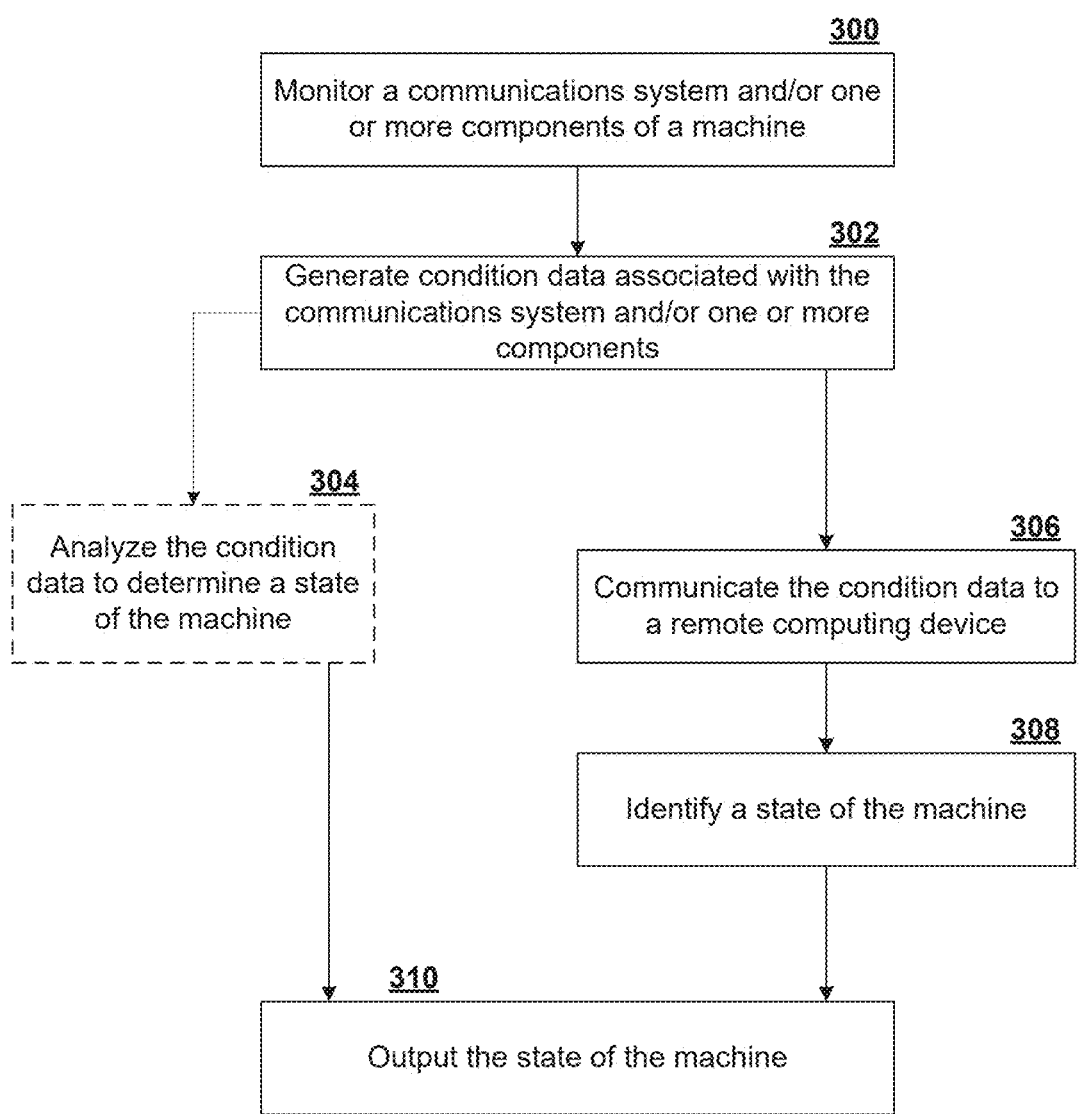
FIG. 3 illustrates a flow chart of an exemplary, non-limiting implementation for performing machine diagnostics according to various aspects.
Figure 4:
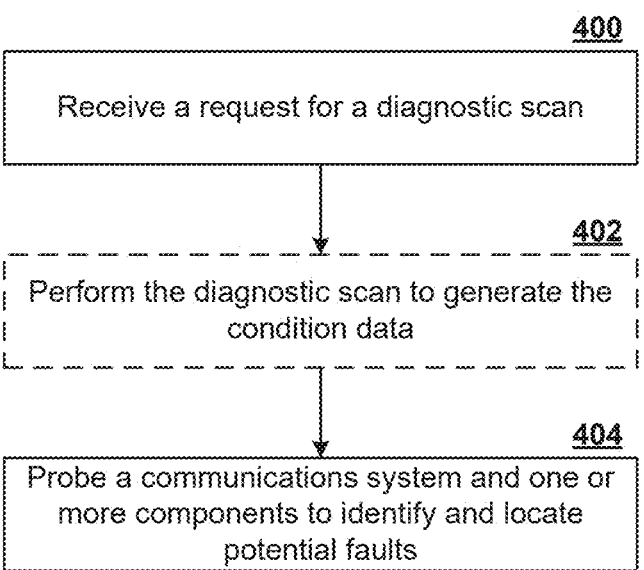
FIG. 4 illustrates a flow chart of an exemplary, non-limiting implementation for performing a diagnostic scan according to another aspect.

Turning to FIGS. 3 and 4, various features and operations of telematics device 140 and/or diagnostics module 210 deployed thereon are illustrated with exemplary flowcharts. The examples in these figures are illustrative of some features of system 100 and/or telematics device 140, but are not exhaustive. Moreover, it is to be appreciated that the methods shown in FIGS. 3 and 4 are not mutually exclusive. Steps of one method may be performed in parallel with steps of the other methods. In addition, the methods in FIGS. 3 and 4 may be interleaved such that steps of the various methods may occur in other orders than those shown in the figures and steps in one method may occur sequentially with steps of other methods. One of ordinary skill in the art will appreciate the manner in which the methods of FIGS. 3 and 4 may combine.

Referring now to FIG. 3, a flowchart of a general method for performing machine diagnostics is illustrated. The method of FIG. 3, in some implementations, may be performed by telematics device 140 and/or computing device 160 shown in FIG. 1. The method may start at reference numeral 300 where a diagnostics device (e.g. a diagnostic tool or module executing on a telematics device) monitors a communications system (e.g. a CAN bus or other communication network of a machine) and/or one or more components of the machine functionally and/or communicatively interconnected via the communications system. Through monitoring, the diagnostics device acquires input data (e.g. DTCs, messages, signals, etc.). At 302, condition data associated with the communications system and/or the one or more components is generated. The condition data may be generated through analysis of the input data acquired via the monitoring.

In one implementation, the diagnostics device (e.g. the telematics device) may analyze the condition data to determine a state of the machine at reference numeral 304. In another implementation, the condition data is communicated to a remote computing device for analysis at 306. In this implementation, the state of the machine is identified at 308 and communicated to the telematics device and/or the operator. Accordingly, regardless of local or remote determination of the state of the machine, the state is output at 310. The output may be to an operator interface of the machine (e.g. in-cab display). The output may also be to a computing device (e.g. mobile computing device) of the operator.

Turning to FIG. 4, a method for performing a diagnostic scan is depicted. At 400, a diagnostics device, such as a diagnostic application deployed on a telematics device, may receive a request for a diagnostic scan. The request may be self-generated by (e.g. triggered by) the diagnostic application. Alternatively, the request may be communicated from a remote computing device (e.g. remote diagnostics server). At 402, in one implementation, the diagnostic application may perform a diagnostic scan to generate the condition data. In this implementation, the diagnostic application is an on-demand diagnostic application. FIG. 3, in contrast, may provide real-time, always-on diagnostic monitoring.

Whether real-time, always on diagnostics is performed by the diagnostic application (FIG. 3) or on-demand scanning (402) is performed, the request may trigger additional scanning or more thorough data collection. For instance, at 404, the diagnostic application can probe the communications system and/or the components to identify and locate potential faults.

Figure 5:
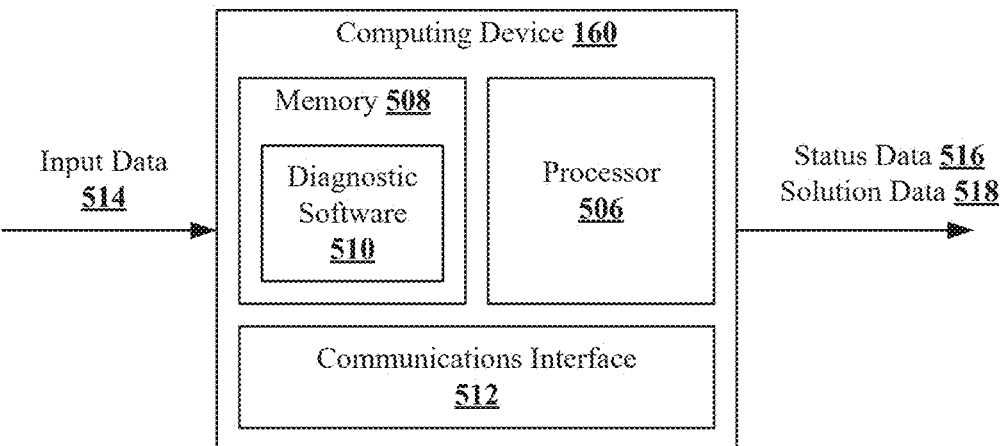
FIG. 5 illustrates a schematic diagram of an exemplary, non-limiting implementation of a diagnostic computing device according to various aspects.

The aspects described above generally related to a diagnostic application deployed on a telematics device of a machine. The data acquired by the telematics device may be communicated to a remote computing device (e.g. computing device 160) for additional processing. Turning on to FIG. 5, an exemplary, non-limiting implementation of such a computing device 160 is illustrated.

Computing device 160 includes a processor 506 configured to process data and instructions, and provide resulting data based on the processed data and instructions. The computing device 160 further includes a memory 508 (e.g., computer memory, such as a device or system that is used to store information for use in a computer or related computer hardware and digital electronic devices, including short and long-term memory, temporary and permanent memory, and the like). Memory 508 stores executable instructions for diagnostic software 510. Diagnostic software 510, when executed by processor 506, acquires input data 514 and generates status data 516 and/or solution data 518. Computing device 160 further includes a communications interface 512 configured for remote communications with remote computing devices such as computing devices of operators and technicians, telematics devices of machines, etc. Communications interface 512 may be a wireless communications interface. Alternatively, communications interface 512 may be a wired interface (e.g. USB, Ethernet, etc.).

As described above, computing device 160 includes diagnostic software 510 that acquires input data 514 from telematics device 140 and/or other sources. According to an example, input data 514 may include condition data from a telematics device 140. Condition data may include data indicative of a condition of a communications system of a machine or components of a machine, such as but not limited to DTCs, controller information tables, network statistics (e.g. CAN bus statistics including error frames, CAN voltages, message counts, percentage bus loading, etc.), supporting information (e.g. machine type, operating condition, location, etc.).

Such condition data may be prior condition data, in-use condition data, or updated condition data. Prior condition data may include fault information associated with one or more machines. Fault information may include identification of particular faults (e.g. status data) and associated condition data. In-use condition data may include live, real-time, or current condition data from a telematics device of a machine in operation. Updated condition data may include condition data from a machine after implementation of a solution or repair intended to resolve a fault.

Prior condition data (e.g. identified faults with associated condition and/or status data) associated with one or more first machines may be utilized to train a first machine learning model. The first machine learning model, in an example, may be a fault simulation model. In this example, input data 514 may further include machine information associated with the first machines and one or more second machines. The first machine information is employed to further train the fault simulation model. In an aspect, the fault simulation model is utilized by diagnostic software 510 to simulate injection of faults (e.g. virtual faults) to the second machines and generate simulated condition data and/or simulated fault information associated with the second machines.

In another aspect, the prior condition data or fault information, together, optionally, with the simulated condition data or fault information, may be utilized by the diagnostic software 510 of computing device 160 to train a second model. The second model, in an example, may be a fault identification model configured to identify a state or fault with a machine. The diagnostic software 510 may utilize the fault identification model together with in-use condition data from a machine to determine a potential fault or other state of the machine (e.g. status data 516). Further, the diagnostic software 510 may evaluate update condition data from the machine (e.g. after implementation of a solution), using the fault identification model in some examples, to determine whether the fault is resolved.

In another aspect, input data 514 may include solution information indicative of solutions resulting in correction of faults. In one example, solution information may include prior solution information associated with prior condition data and/or fault information. The solution information may further indicate solutions for simulated faults or conditions. Diagnostic software 510 may utilize the solution information to train a third model. The third model may be a solution recommendation model that recommends one or more solutions or actions (e.g. solution data 518) based on received condition or fault information. The third model may be updated after confirmation of a solution resolving an issue based on updated condition data acquired after implementation of the solution.

In one aspect, the diagnostic software 510 may acquire the data described above and train the models. In another example, the models may be trained offline by another computing device and installed in the diagnostic software 510 for use online. Still further, in some examples, the diagnostic software 510 and/or the models may be installed on the telematics device 140 or other controller of machine 110 for use on the machine.

Figure 6:
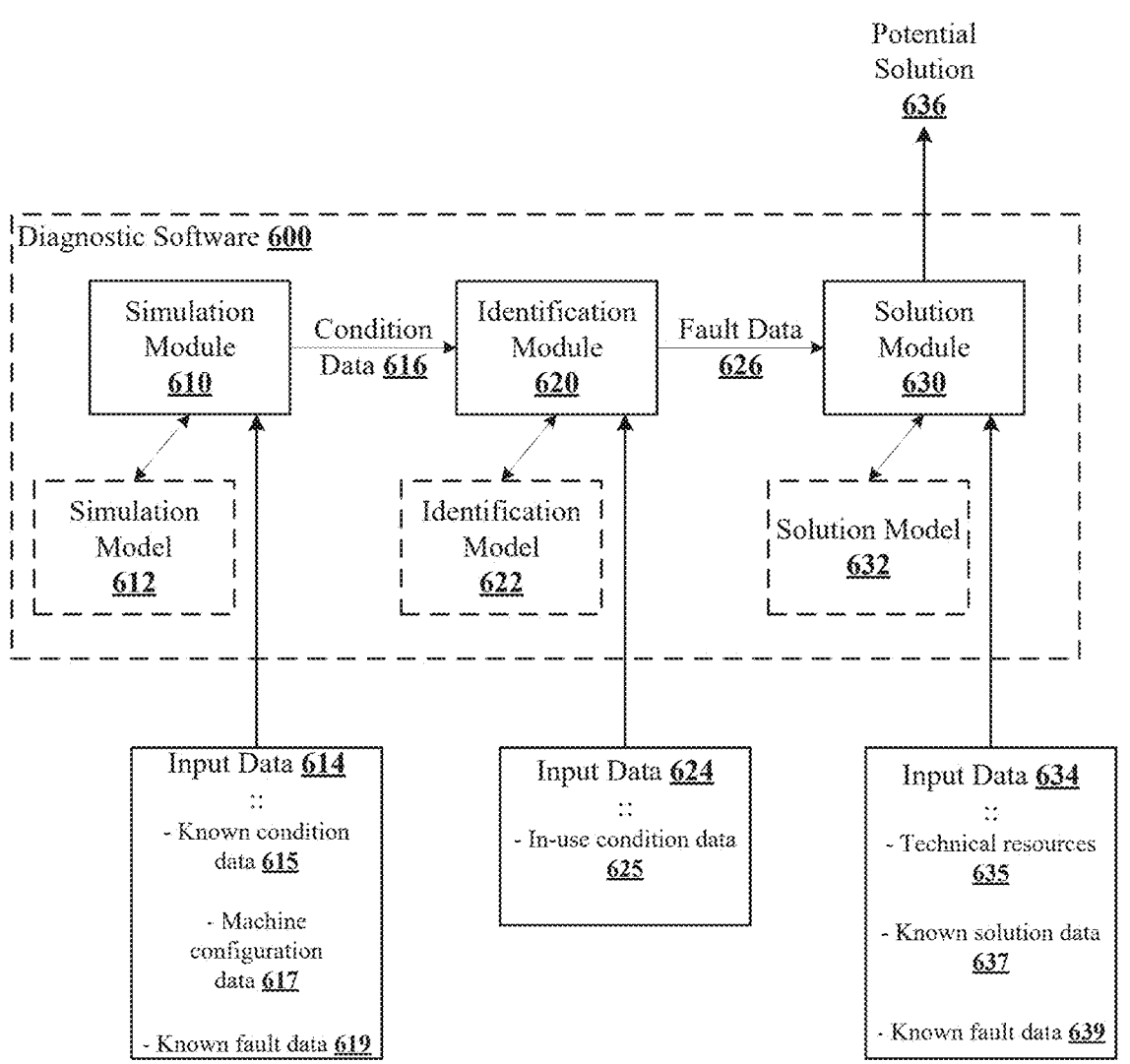
FIG. 6 illustrates a schematic diagram of an exemplary, non-limiting implementation of diagnostic software according to various aspects.

Turning to FIG. 6, illustrated is a schematic diagram of an exemplary, non-limiting implementation of diagnostic software 600 in accordance with various aspects. Diagnostic software 600, in an example, may implement diagnostic software 510 of FIG. 5.

Diagnostic software 600 includes functional components implemented with computer-executable instructions that, when executed by a computer processor, carry out the functions described herein. Diagnostic software 600 includes a simulation module 610 configured to simulate injection of faults (e.g. virtual faults) to various machines. Simulation module 610 may acquire input data 614. Input data 614 may include known condition data 615 and known fault data 619 associated with the known condition data 615. In addition, input data 614 may include machine configuration data 617. The machine configuration data 617 may indicate characteristics, components, structure, and other information related to machines from which the known condition data 615 and known fault information 619 was acquired. These inputs may be utilized by simulation module 610 to train a machine learning model such as simulation model 612.

Simulation module 610, using simulation model 612, may simulate injection of virtual faults to additional machines. To this end, machine configuration data 617 may indicate characteristics of machines on which faults are simulated. As shown in FIG. 6, simulation module 610 may output condition data 616, which includes known condition data 615 and known fault data 619, as well as simulated condition data associated with virtual faults.

Condition data 616, in an aspect, is employed by an identification module 620 to train an identification model 622 (e.g. a machine learning model). The identification model 622, in one example, determines faults or other states of a machine, a communications system of the machine, or component of the machine. In operation, identification module 620 may acquire input data 624, which may include in-use condition data 625. In-use condition data 625 may include condition data from a machine in operation, which may be acquired from a telematics device (e.g. telematics device 140) installed on the machine in operation. The identification module 620, using the identification model 622, analyzes the in-use condition data 625 to determine whether there is a potential fault with the machine or component thereof. Generally, identification module 620 acquires condition data and outputs fault data 626 indicative of any faults identified based on the condition data.

Diagnostic software 600, in another example, includes a solution module 630 that acquires fault data 626 and outputs a potential solution 636 or other actions to be taken (e.g. further data acquisition, thorough diagnostic scan, etc.). Solution module 630 may further acquire input data 634. Input data 634 may include technical resources 635 regarding machines and components thereof, known solution data 637, and known fault data 639. Using input data 634, solution module 630 can train a machine learning model-solution model 632. Solution module 620 may utilize solution model 632 to determine potential solution 636 based on fault data 626. In an aspect, sources of input data 634 may include information from a case and contact management system (CCMS), dealer technical assistance system data, information from warranty claims, information from dealer parts and labor and/or work order data, information from an expert connect system, information from analysis and dealer and/or customer notification platform (e.g., John Deere Expert Alerts), information from interactive or guided solutions systems, and/or information from next generation dealer/technician tools (e.g. John Deere Service ADVISOR).

Figure 7:
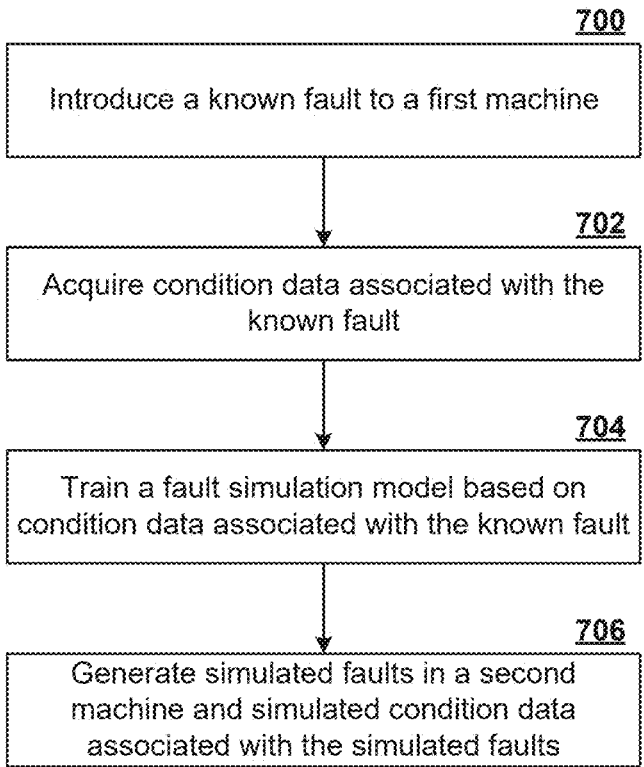
FIG. 7 illustrates a flow chart of an exemplary, non-limiting implementation for simulating virtual faults according to an aspect.
Figure 8:
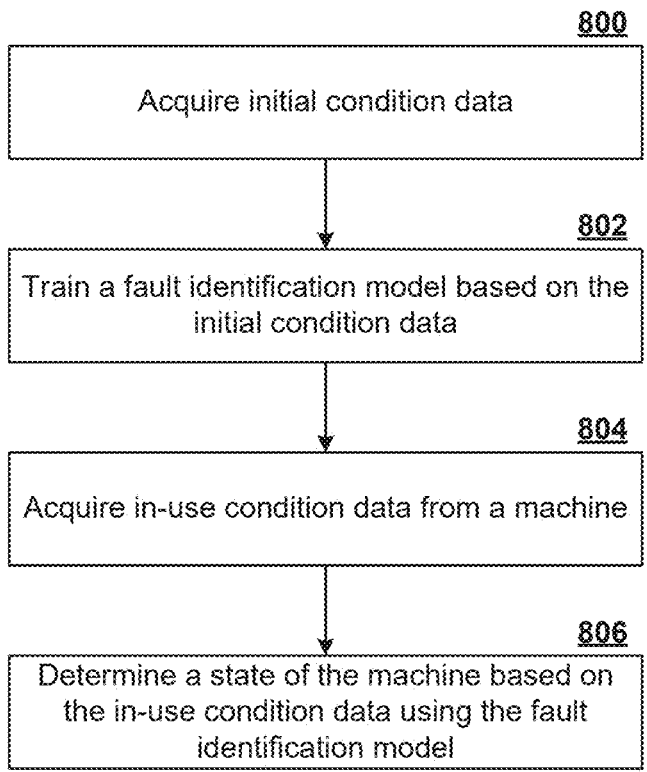
FIG. 8 illustrates a flow chart of an exemplary, non-limiting implementation for training and utilizing a fault identification model according to another aspect.
Figure 9:
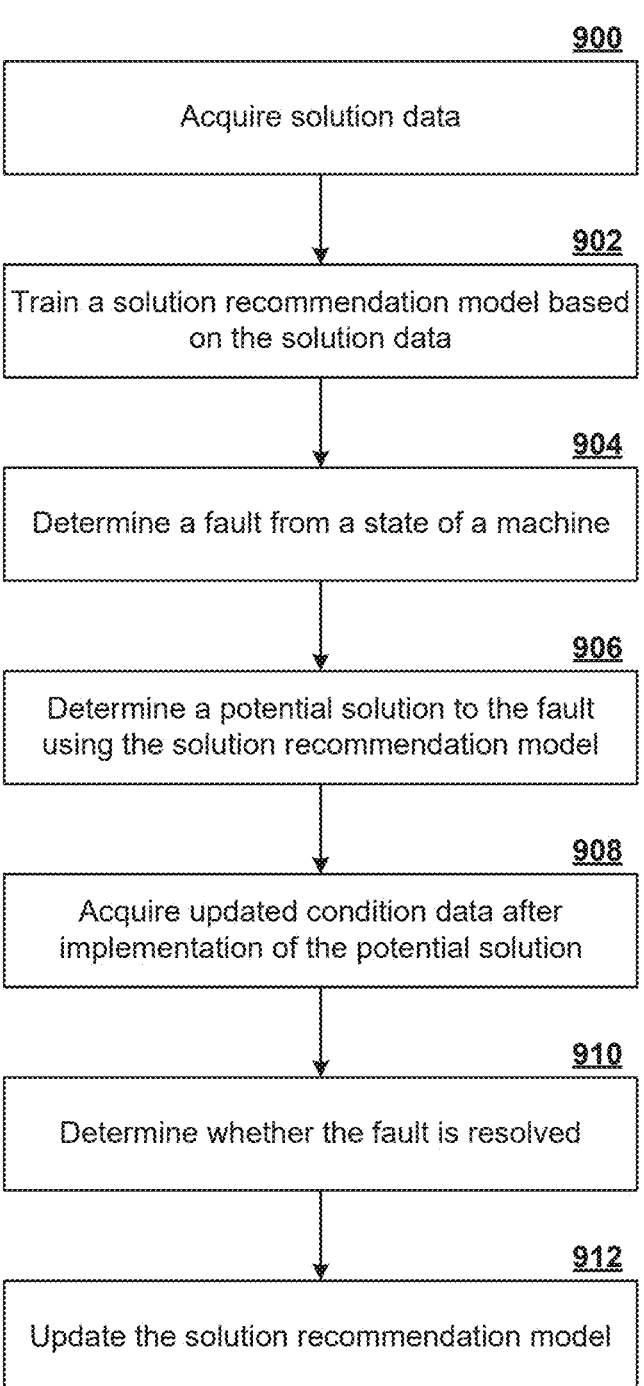
FIG. 9 illustrates a flow chart of an exemplary, non-limiting implementation for training and utilizing a solution recommendation model according to another aspect.

Turning to FIGS. 7-9, various features and operations of computing device 160 and/or diagnostics software 510, 600 deployed thereon are illustrated with exemplary flowcharts. The examples in these figures are illustrative of some features of system 100 and/or computing device 160, but are not exhaustive. Moreover, it is to be appreciated that the methods shown in FIGS. 7-9 are not mutually exclusive. Steps of one method may be performed in parallel with steps of the other methods. In addition, the methods in FIGS. 7-9 may be interleaved such that steps of the various methods may occur in other orders than those shown in the figures and steps in one method may occur sequentially with steps of other methods. One of ordinary skill in the art will appreciate the manner in which the methods of FIGS. 7-9 may combine.

Referring now to FIG. 7, a flowchart for a method of simulating virtual faults is illustrated. The method may begin at reference numeral 700 where a known fault is introduced to a first machine. At 702, condition data associated with the known fault is acquired from the first machine. At 704, a fault simulation model is trained base on the condition data associated with the known fault. At 706, simulated faults (e.g. virtual faults) in a second machine are generated. Further, simulated condition data associated with the simulated faults is also generated. In an aspect, the simulated faults and simulated condition data may be utilized to further train a fault identification model as described herein.

Turning now to FIG. 8, a method for training and utilizing a fault identification model is illustrated. The method may begin at reference numeral 800 where initial condition data is acquired. At reference numeral 802, a fault identification model is trained based on the initial condition data. At 804, in-use condition data from a machine is acquired. At 806, a state of the machine is determined based on the in-use condition data using the fault identification model. The model may also be updated based on the in-use condition data and the state of the machine determined.

FIG. 9 illustrates a flowchart of an exemplary, non-limiting method for training and utilizing a solution recommendation model. The method may begin at reference numeral 900 where solution data is acquired. Solution data may include solutions for known faults and conditions, machine information, and/or other technical resources. At 902, a solution recommendation model is trained based on the solution data. At 904, a fault with a machine is determined. For instance, the fault may be determined according to the method of FIG. 8. At 906, a potential solution to the fault is determined based on the solution recommendation model. After the potential solution is enacted, for example, at 908, updated condition data is acquired. Based on the updated condition data, it is determined, at 910, whether the fault is resolved. At 912, the solution recommendation model is updated based on the potential solution if the potential solution corrects the fault.

Figure 10:
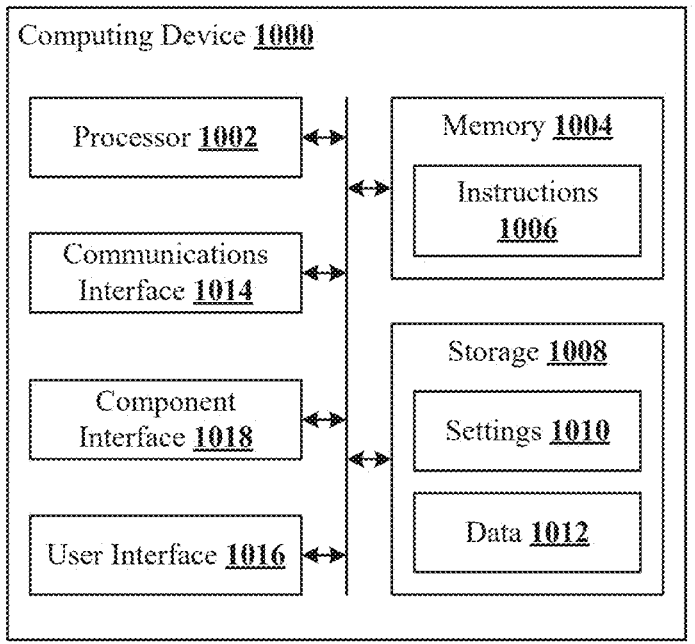
FIG. 10 is a schematic diagram of an exemplary, non-limiting implementation of a computing device according to various aspects.

Turning to FIG. 10, illustrated is a schematic block diagram of an exemplary, non-limiting implementation for the computing device 1000. Computing device 1000 may be utilized to implement system 100, computing device 160, telematics device 140, other controllers of machine 110, or other computing devices. Computing device 1000 includes a processor 1002 configured to execute computer-executable instructions 1006 such as instructions composing diagnostic module 210, or diagnostic software 510, 600. Such computer-executable instructions 1006 can be stored on one or more computer-readable media including non-transitory, computer-readable storage media such as memory 1004. Memory 1004 can also include other data (working data or variables) or portions thereof during execution of instructions 1006 by processor 1002.

The computing device 1000 can also include storage 1008 that can be, according to an embodiment, non-volatile storage to persistently store instructions 1006, settings 1010 and/or data 1012.

The computing device 1000 may also include a user interface 1016 that comprises various elements to obtain user input and to convey user output. For instance, user interface 1016 can comprise of a touch display, which operates as both an input device and an output device. In addition, user interface 1016 can also include various buttons, switches, keys, etc. by which a user can input information to computing device 1000; and other displays, LED indicators, etc. by which other information can be output to the user. Further still, user interface 1016 can include input devices such as keyboards, pointing devices, and standalone displays.

The computing device 1000 further includes a communications interface 1014 to couple computing device 1000, via the a communications network, to various devices such as, but not limited to, other computing devices 1000, telematics device 140, machine 110, other controllers, servers, or Internet-enabled devices (e.g., IoT devices). Communication interface 1014 can be a wired or wireless interface including, but not limited to, a WiFi interface, an Ethernet interface, a Bluetooth interface, a fiber optic interface, a cellular radio interface, a satellite interface, etc.

A component interface 1018 is also provided to couple computing device 600 to various components. Component interface 1018 can include a plurality of electrical connections on a circuit board or internal bus of computing device 1000 that is further coupled to processor 1002, memory 1004, etc. Component interface 1018, in another embodiment, can be an interface for a CAN bus of machine 110. Further, the component interface 1018 can implement various wired or wireless interfaces such as, but not limited to, a USB interface, a serial interface, a WiFi interface, a short-range RF interface (Bluetooth), an infrared interface, a near-field communication (NFC) interface, etc.

According to an aspect, a system is provided. The system includes a machine having one or more components. The system also includes a communications system communicatively coupling at least the one or more components of the machine. In addition, the system includes a telematics device communicatively coupled to the communications system. The telematics device includes a communications interface communicatively coupling the telematics device with a remote computing device, and at least one processor coupled to a memory storing computer-executable instructions. The instructions, when executed by the at least one processor, configure the at least one processor to: monitor at least one of the communications system or the one or more components; generate condition data indicative of a condition of the at least one of the communications system or the one or more components; and communicate at least one of the condition data to the remote computing device to identify a state of the machine.

In an example, the at least one processor is further configured to: determine status data indicative of a state of the at least one of the communications system or the one or more components; and analyze condition data or the status data to identify the state of the machine.

In another example, the at least one processor is further configured to output the state of the machine to an operator. The at least one processor is further configured to output the state of the machine to the operator via an in-cab display.

In another example, the at least one processor is further configured to monitor and generate condition data in real-time. The at least one processor is further configured to analyze real-time data to identify trending condition data. The at least one processor is further configured to communicate the trending condition data to the remote computing device.

In another example, the condition data includes one or more of: a diagnostic trouble code; a voltage; a message count; a number of error frames; or a load on the communications system.

In another example, the communications system is a controller area network (CAN) bus. In yet another example, each of the one or more components includes a controller. In yet another example, the state of the at least one of the communications system or the one or more components includes an issue with an operation of the at least one of the communications system or the one or more components.

In another example, the state of the at least one of the communications system or the one or more components indicates at least one of a potential issue, a need for maintenance, or an estimated time until maintenance.

In another example, the at least one processor is further configured to receive, via the remote computing device, a request for a diagnostic scan. The at least one processor is further configured to perform the diagnostic scan of the at least one of the communications system or the one or more components. The at least one processor is further configured to probe, via the communications system, the at least one of the communications system or the one or more components to identify and locate potential issues.

In another aspect, a method for analysis of a communications system of a machine is provided. The method includes monitoring at least one of the communications system or a plurality of components interconnected via the communications system, wherein the monitoring is performed by a telematics device communicatively coupled to the communications system. The method also includes generating, by the telematics device, condition data indicative of a condition of the at least one of the communications system or the one or more components. IN addition, the method may include communicating, by the telematics device, the condition data to a remote computing device to identify a state of the machine.

In an example, the monitoring occurs in real-time. In another example, the method also includes receiving, at the telematics device, a request for a diagnostic scan from the remote computing device; and in response to receiving the request, probing, by the telematics device and via the communications system, the at least one of the communications system or the one or more components to identify and locate potential issues.

According to yet another aspect, a telematics device is provided. The telematics device includes a remote communications module for communicatively coupling the telematics device to a remote computing device. The telematics device further includes a communications interface for communicatively coupling the telematics device to a communications system of a machine, wherein the machine includes a plurality of components respectively coupled to the communications system of the machine. The telematics device also includes a non-transitory, computer-readable storage medium storing computer-executable instructions and configured to store collected data indicative of a condition of the communications system or the plurality of components. The telematics device also includes a processor. The processor, when executing the computer-executable instructions, is configured to: monitor the communications system and the plurality of components in real-time to generate condition data indicative of a condition of the communications system or the plurality of components; determine status data indicative of a state of the at least one of the communications system or the plurality of components; communicate at least one of the condition data or the status data to the remote computing device to identify a state of the machine.

In an example, the communications system of the machine is a controller area network (CAN) bus and the plurality of components include a plurality of controller units.

According to an aspect, a system is provided. The system includes at least one processor coupled to a memory storing computer-executable instructions. The instructions, when executed by the at least one processor, configure the at least one processor to: acquire first fault information associated with a first set of machines; train a first model based on the first fault information associated with the first set of machines; simulate, using the first model, injection of faults for a second set of machines to generate second fault information; and train a second model based on the first fault information and the second fault information.

In an example, the at least one processor is further configured to: acquire first solution information indicative of solutions resulting in correction of faults indicated by the first fault information; acquire second solution information indicative of solutions to correct faults indicated by the second fault information; and train a third model based on the first solution information and the second solution information. Further to this example, the first model, the second model, and the third model are aggregated into a single module.

In another example, the at least one processor is further configured to: receive in-use condition data from a machine; and identify a fault in the machine, using the second model, based on the in-use condition data. Further to this example, at least one of the first fault information, the second fault information, or the in-use condition data include one or more of: a diagnostic trouble code; a voltage; a message count; a number of error frames; or a load on a communications system of a machine. Further, at least one of the first fault information, the second fault information, or the in-use condition data relate to one or more components of a machine or a communications system of a machine. In an example, the communications system is a controller area network (CAN) bus. In a further example, the at least one processor is further configured to update the second model with the fault identified and the in-use condition data.

In another example, the at least one processor is further configured to: receive in-use condition data from a machine; identify a fault in the machine, using the second model, based on the in-use condition data; and determine a potential solution to the fault identified using the third model. Further to this example, the at least one processor is further configured to: acquire updated condition data from the machine following implementation of the potential solution; determine correction of the fault identified based on the updated condition data; and update the third model based on the potential solution.

In another example, the at least one processor is included in a computing device remote from the machine, and the at least one processor is further configured to remotely acquire the in-use condition data from a diagnostic device on the machine. Further to this example, the at least one processor is further configured to communicate a request for a diagnostic scan to the diagnostic device on the machine, wherein the at least one processor receives the in-use condition data in response to the request.

According to another aspect, a method for a machine diagnostic system is provided. The method includes introducing a known fault to at least one of a component or a communications system of a first machine. The method also includes acquiring condition data associated with the known fault after introduction. The method further includes training a fault simulation model based at least in part on the condition data acquired. In addition, the generating simulated faults in a second machine and simulated condition data with the fault simulation model. In addition, the method includes training a fault identification model based at least in part on the condition data and the simulated condition data.

In an example, the method also includes acquiring solution data indicative of a solution resulting in correction of the known fault; and training a solution recommendation model based at least in part on the solution data. Further to this example, the method also include receiving in-use condition data from a second machine; determining a state of at least one of a communications system of the second machine or a component of the second machine based on the in-use condition data using the fault identification model;

and outputting the state of the at least one of the communications system or the component. Still further, the method may also include determining whether the state of the at least one of the communications system or the component indicates a fault; determining a potential solution to the fault based on the solution recommendation model; and outputting the potential solution to a user.

In further examples, the method includes receiving updated condition data from the second machine after implementation of the potential solution; determining whether the fault is resolved; and updating the solution recommendation model based on the potential solution implemented. In another example, receiving the in-use condition data from the second machine includes receiving the in-use condition remotely collected and transmitted by a diagnostic device on the second machine. In another example, the in-use condition data includes one or more of: a diagnostic trouble code; a voltage; a message count; a number of error frames; or a load on a communications system of a machine.

According to yet another aspect, a system is provided. The system includes a computing device; and a machine having: one or more components, a communications system communicatively coupling at least the one or more components of the machine, and a telematics device communicatively coupled to the communications system of the machine and to a remote computing device. The computing device includes at least one processor coupled to a memory storing computer-executable instructions, the instructions, when executed by the at least one processor, configure the at least one processor to: receive in-use condition data from the machine via the telematics device; identify a fault in the machine, using a fault identification model, based on the in-use condition data; determine a potential solution to the fault in the machine, using a solution recommendation model, based on at least one of the fault identified in the machine or the in-use condition data; output the potential solution to a user; receive updated condition data from the machine via the telematics device after implementation of the potential solution; and confirm the fault in the machine is resolved. The fault identification model and solution recommendation model are trained based on one or more of condition data collected based on introduction of known faults to a first set of machines, virtual condition data associated with simulated faults to a second set of machines, and solution data derived from technical resources.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for health diagnostics have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for health diagnostics. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination.

Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication.

In summary, various embodiments and examples of systems and methods for a health diagnostic system have been disclosed. Although the systems and methods for the health diagnostic system have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The invention claimed is:

1. A system, comprising:

at least one processor coupled to non-transitory computer readable media storing computer-executable instructions, the instructions, when executed by the at least one processor, configure the at least one processor to:

acquire first fault information associated with a first set of machines, wherein the first fault information includes prior condition data related to prior faults associated with the first set of machines;

train a first model based on the first fault information associated with the first set of machines, wherein the first model is a simulation model;

simulate, using the first model, injection of faults for a second set of machines to generate second fault information, wherein the second fault information includes condition data related to simulated faults associated with the second set of machines; and train a second model based on the first fault information and the second fault information, wherein the second model is a fault identification model.

2. The system of claim 1, wherein the at least one processor is further configured to:

acquire first solution information indicative of solutions resulting in correction of faults indicated by the first fault information;

acquire second solution information indicative of solutions to correct faults indicated by the second fault information; and train a third model based on the first solution information and the second solution information.

3. The system of claim 2, wherein the first model, the second model, and the third model are aggregated into a single module.

4. The system of claim 1, wherein the at least one processor is further configured to:

receive in-use condition data from a machine; and identify a fault in the machine, using the second model, based on the in-use condition data.

5. The system of claim 4, wherein at least one of the first fault information, the second fault information, or the in-use condition data include one or more of:

a diagnostic trouble code;

a voltage;

a message count;

a number of error frames; or a load on a communications system of a machine.

6. The system of claim 4, wherein at least one of the first fault information, the second fault information, or the in-use condition data relate to one or more components of a machine or a communications system of a machine.

7. The system of claim 6, wherein the communications system is a controller area network (CAN) bus.

8. The system of claim 4, wherein the at least one processor is further configured to update the second model with the fault identified and the in-use condition data.

9. The system of claim 2, wherein the at least one processor is further configured to:

receive in-use condition data from a machine;

identify a fault in the machine, using the second model, based on the in-use condition data; and determine a potential solution to the fault identified using the third model.

10. The system of claim 9, wherein the at least one processor is further configured to:

acquire updated condition data from the machine following implementation of the potential solution;

determine correction of the fault identified based on the updated condition data; and update the third model based on the potential solution.

11. The system of claim 4, wherein the at least one processor is included in a computing device remote from the machine, and the at least one processor is further configured to remotely acquire the in-use condition data from a diagnostic device on the machine.

12. The system of claim 11, wherein the at least one processor is further configured to communicate a request for a diagnostic scan to the diagnostic device on the machine, wherein the at least one processor receives the in-use condition data in response to the request.

13. A method for a machine diagnostic system, comprising:

introducing a known fault to at least one of a component or a communications system of a first machine;

acquiring condition data associated with the known fault after introduction;

training a fault simulation model based at least in part on the condition data acquired;

generating simulated faults in a second machine and simulated condition data with the fault simulation model; and training a fault identification model based at least in part on the condition data and the simulated condition data.

14. The method of claim 13, further comprising:

acquiring solution data indicative of a solution resulting in correction of the known fault; and training a solution recommendation model based at least in part on the solution data.

15. The method of claim 14, further comprising:

receiving in-use condition data from a second machine;

determining a state of at least one of a communications system of the second machine or a component of the second machine based on the in-use condition data using the fault identification model; and outputting the state of the at least one of the communications system or the component.

16. The method of claim 15, further comprising:
determining whether the state of the at least one of the communications system or the component indicates a fault;
determining a potential solution to the fault based on the solution recommendation model; and
outputting the potential solution to a user.

17. The method of claim 16, further comprising:
receiving updated condition data from the second machine after implementation of the potential solution;
determining whether the fault is resolved; and
updating the solution recommendation model based on the potential solution implemented.

18. The method of claim 15, wherein receiving the in-use condition data from the second machine includes receiving the in-use condition remotely collected and transmitted by a diagnostic device on the second machine.

19. The method of claim 15, wherein the in-use condition data includes one or more of:
a diagnostic trouble code;
a voltage;
a message count;
a number of error frames; or
a load on a communications system of a machine.

20. A system, comprising:
a computing device; and
a machine having one or more components, a communications system communicatively coupling at least the one or more components of the machine, and a telematics device communicatively coupled to the communications system of the machine and to a remote computing device,
wherein the computing device includes at least one processor coupled to a non-transitory computer-readable media storing computer-executable instructions, the instructions, when executed by the at least one processor, configure the at least one processor to:
receive in-use condition data from the machine via the telematics device;
identify a fault in the machine, using a fault identification model, based on the in-use condition data;
determine a potential solution to the fault in the machine, using a solution recommendation model, based on at least one of the fault identified in the machine or the in-use condition data;
output the potential solution to a user;
receive updated condition data from the machine via the telematics device after implementation of the potential solution; and
confirm the fault in the machine is resolved, and
wherein the fault identification model and solution recommendation model are trained based on one or more of condition data collected based on introduction of known faults to a first set of machines, virtual condition data associated with simulated faults to a second set of machines, and solution data derived from technical resources.

* * * * *